July 1, 1924.  1,499,713
L. A. WILLIAMSON ET AL
TWIN GEAR LOCOMOTIVE DRIVE
Filed March 1, 1923   6 Sheets-Sheet 6
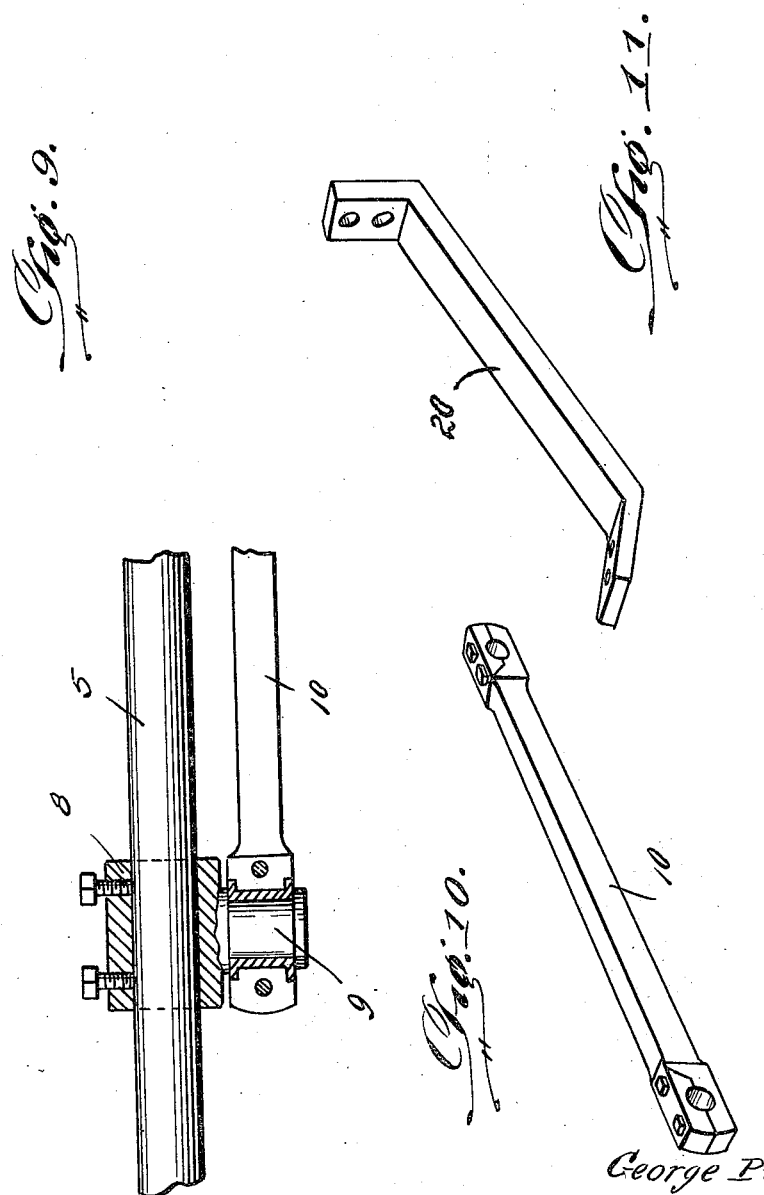
Witnesses:
F. L. Fox.
H. Berman
George Pinto
L. A. Williamson
Inventor
Attorney Patented July 1, 1924.

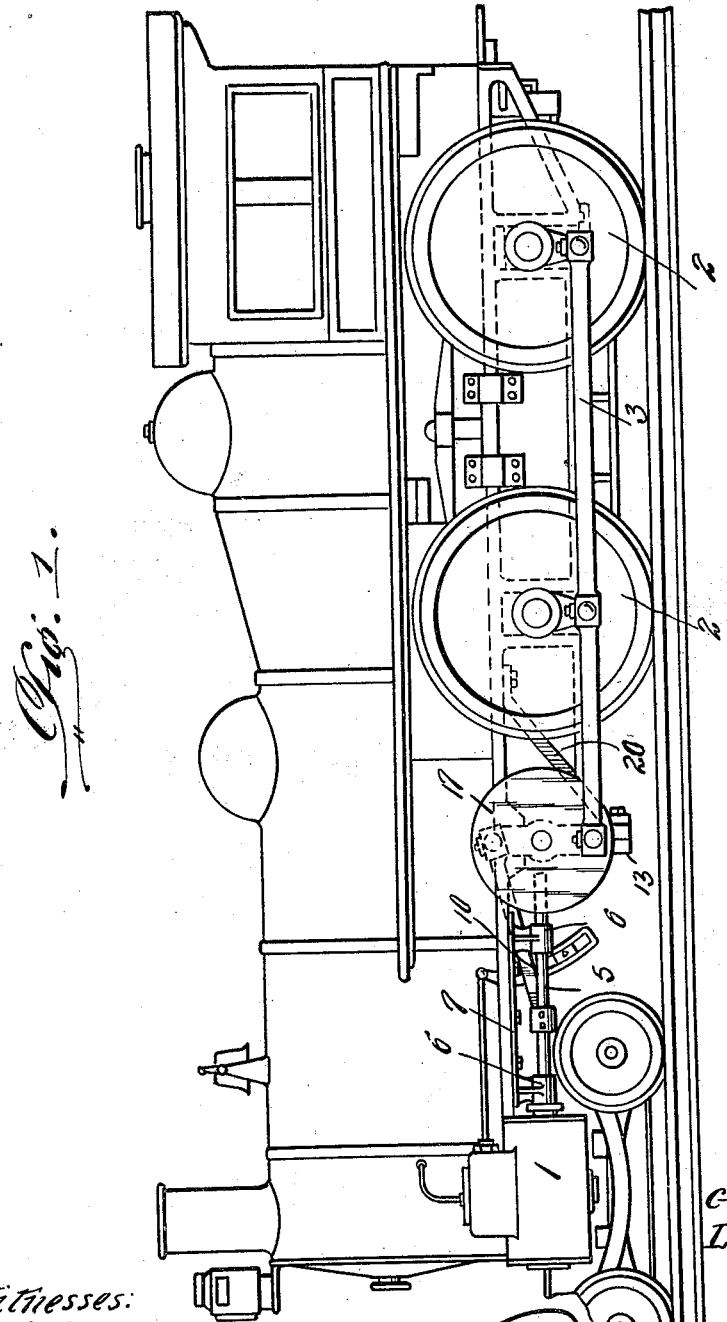

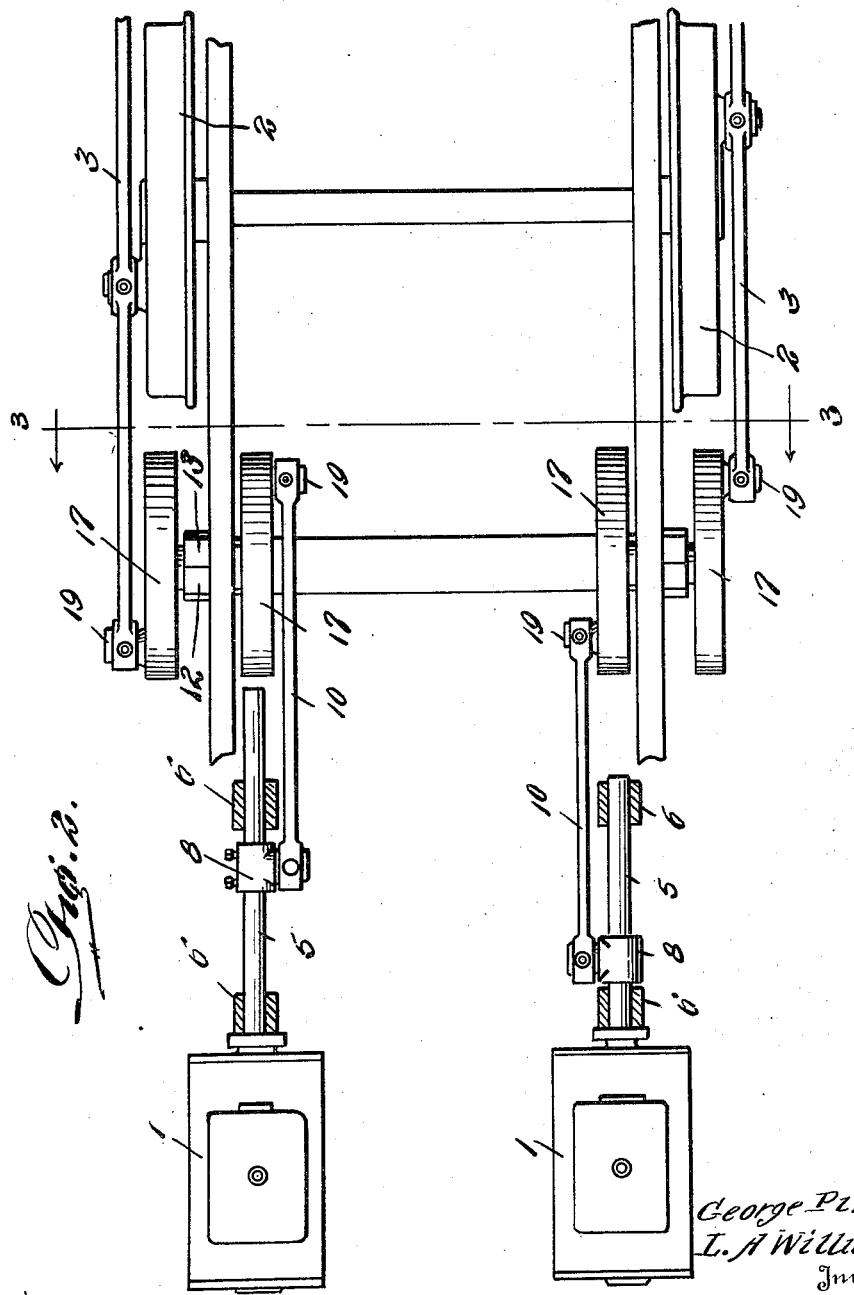

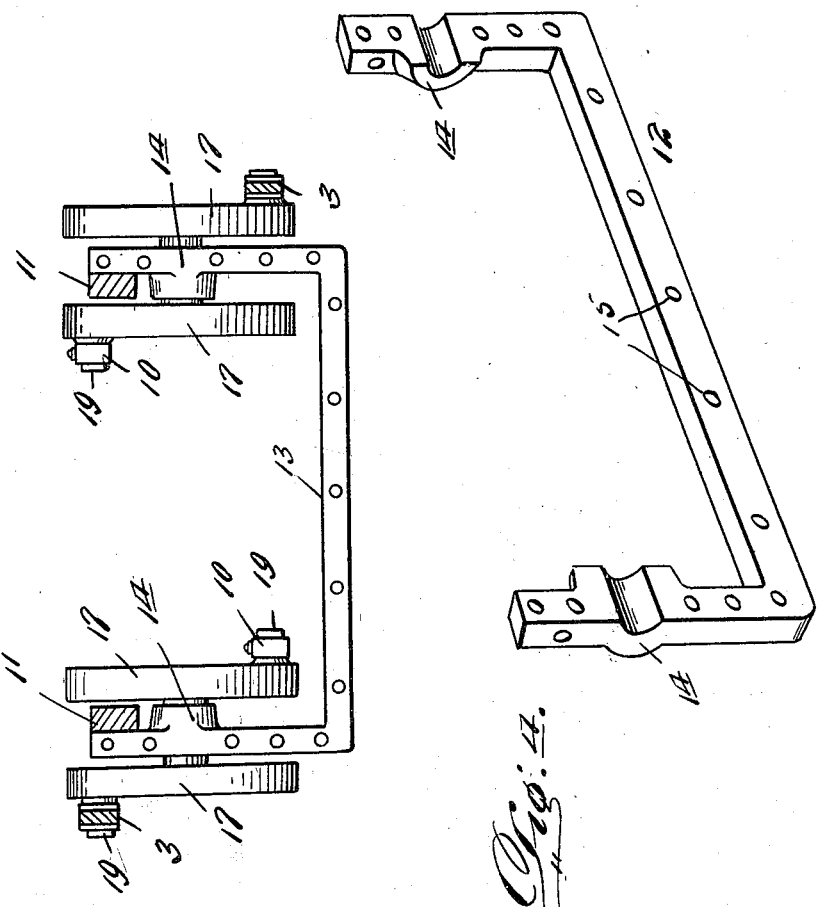

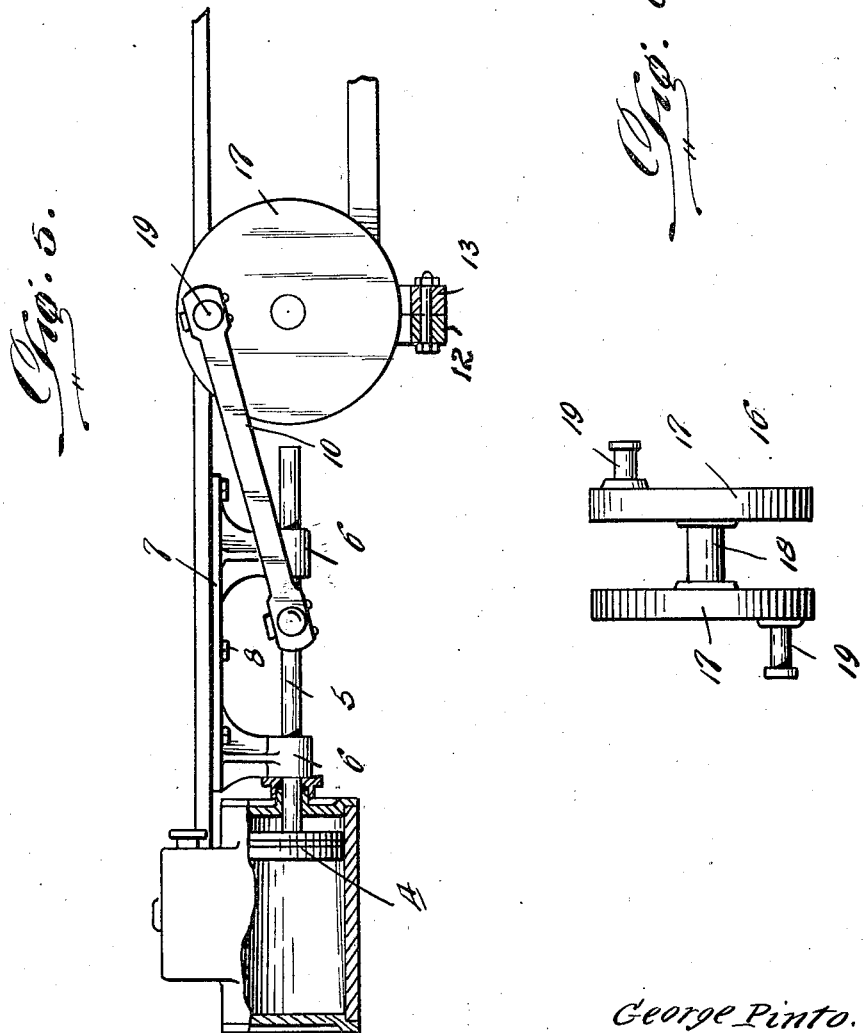

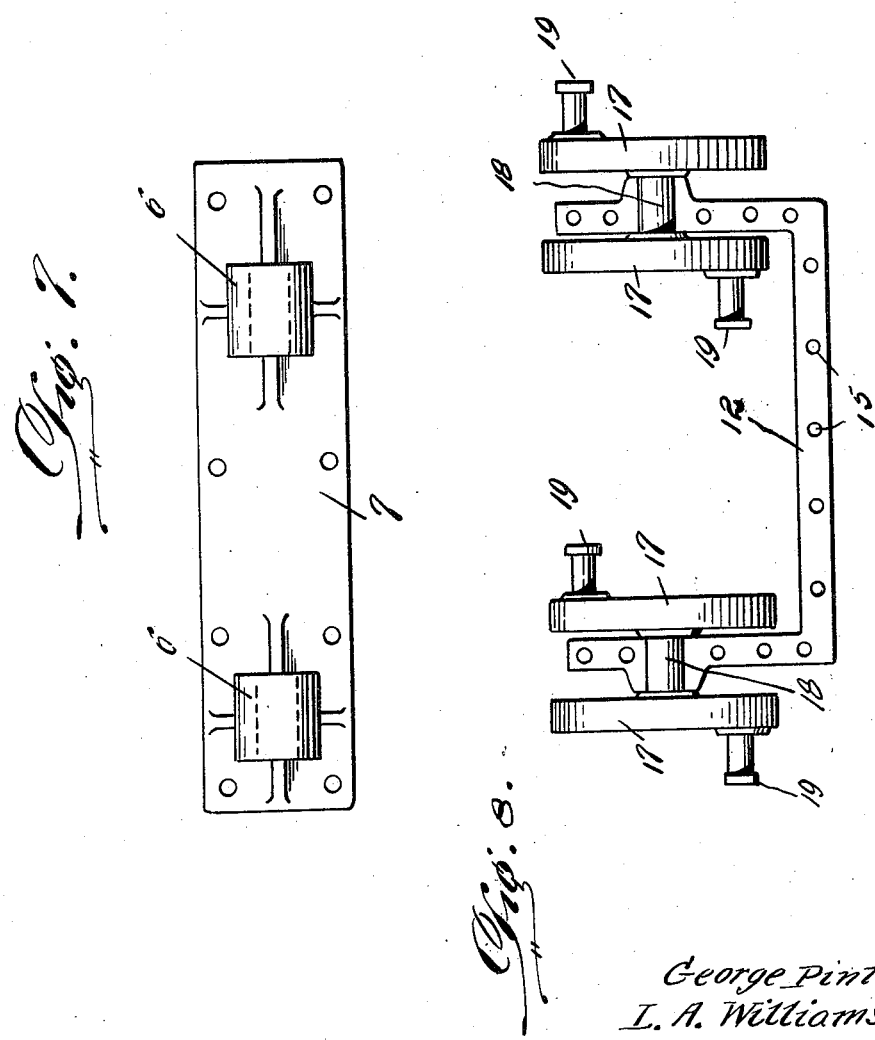

1,499,713

UNITED STATES PATENT OFFICE.

LOZELLA A. WILLIAMSON AND GEORGE PINTO, OF HAMMONTON, NEW JERSEY.

TWIN-GEAR LOCOMOTIVE DRIVE.

Application filed March 1, 1923. Serial No. 622,050.

*To all whom it may concern:*

Be it known that we, LOZELLA A. WILLIAMSON and GEORGE PINTO, citizens of the United States, residing at Hammonton, in the county of Atlantic and State of New Jersey, have invented certain new and useful Improvements in Twin-Gear Locomotive Drives, of which the following is a specification.

Our present invention pertains to locomotive drive gear; and it has for its object the provision of a twin-gear locomotive drive gear of such character that the pitman connection between the piston rod and the drive wheel is separated from connection to the same eccentric pin from the connection between the driving wheels for eliminating the excessive strain on the eccentric connection at the first drive wheel which occurs on the structures now in use.

Other objects and practical advantages of our invention will be fully understood from the following description and claims when the same are read in connection with the drawings accompanying and forming part of our invention, in which:—

Figure 1 is a side elevation of a locomotive equipped with the construction constituting the preferred embodiment of our invention.

Figure 2 is a horizontal section of the improvement, with parts in plan.

Figure 3 is a transverse section taken in the plane indicated by the line 3—3 of Figure 2.

Figure 4 is a perspective of one of the members of the pendent frame.

Figure 5 is a detail longitudinal vertical section.

Figure 6 is an end elevation of one of the twin-crank rotors.

Figure 7 is an enlarged inverted plan of one of the hanger guides of the piston rods.

Figure 8 is a detail view showing one member of the pendent frame and the two twin-crank rotors in proper relation.

Figure 9 is an enlarged detail section showing one of the connections.

Figure 10 is a perspective of one of the pitman rods.

Figure 11 is a detail perspective of one of the braces of the pendent frame.

Similar numerals of reference designate corresponding parts in all of the views of the drawings.

The cylinders of the locomotive are designated by 1, the drive wheels by 2; and the connecting rods on the drive wheels by 3. Movable rectilinearly in the cylinders 1 are pistons 4, the rods 5 of which are supported and guided in the pendent portions 6 of hanger-guides 7, Figures 1, 2, 5 and 7, bolted to the main frame of the locomotive. Fixed, preferably in adjustable manner on the piston rods 5 are sleeves 8 that carry lateral pins 9, and appropriately connected to the said pins 9 are the forward portions of pitman rods 10, arranged in parallelism as best shown in Figure 2.

Longitudinal bars comprised in the main frame of the locomotive are designated by 11, Figure 3, and bolted or otherwise appropriately connected to the bars 11 are the members 12 and 13 of the pendent transverse frame, the said members 12 and 13 being provided on their upright portions with matching journal-box sections 14, and being detachably bolted together as indicated by 15.

The twin-crank rotors 16 of our improvement respectively comprise parallel crank disks 17, a central shaft 18 between the disks 17 and diametrically-opposite lateral pins 19 on the disks 17. The shafts 18 of the rotors are journaled in the box sections 14 of the pendent frame members 12 and 13, and one of the pins 19 of each rotor is connected to one of the connecting rods 3 and the other pin 19 is connected to one of the pitmen or rods 10.

Interposed between and fixed to the locomotive frame and the lower corner portions of the pendent transverse frame are inclined braces 20, Figures 1 and 11. These braces 20 serve to lend increased stiffness and strength to the pendent transverse frame which carries the twin rotors 16, and to hold the said frame against movement when the drive gear is in operation.

In the practical operation of the improvement the reciprocatory motion of the pistons 4 is converted into rotary motion by the rods 10 in combination with the twin-crank rotors, and rotary motion is transmitted from the outer of the crank disks directly to the connecting rods 3 on the drive wheels 2. From this it is evident that instead of having a direct drive connection between the piston rod and the main drive connection, an indirect connection is utilized. This indirect connection is in the form of a supplemental tie, the same being composed of the pitman 10, which is connected with the crank discs 17 at one end and connected at its opposite end with the aforesaid piston rod. It will be further noted that the leverage and therefore the driving power of the cylinders relative to the wheels may be changed by changing the crank disc 17 in which the respective cranks on said disc are arranged at relative different distances from the center thereof to either reduce or increase the leverage to the driving wheels.

Manifestly notwithstanding its practical advantages our improvement is simple and inexpensive in construction and is adapted to be installed in locomotives at present in use as well as in locomotives in course of building.

We have entered into a detailed description of the construction and relative arrangement of parts embraced in the present and preferred embodiment of our invention in order to impart a full, clear and exact understanding of the said embodiment. We do not desire, however, to be understood as confining ourselves to the specific construction and relative arrangement of parts inasmuch as in the future practice of the invention various changes and modifications may be made such as fall within the scope of our invention as defined in our appended claims.

Having described our invention, what we claim and desire to secure by Letters Patent, is:—

1. In a locomotive, the combination with the main frame, drive wheels, connecting rods on said wheels, cylinders, pistons movable in said cylinders, and rods on the pistons; of hanger guides connected to the main frame and receiving said rods, a transverse pendent frame on the main frame and having journal boxes, twin-crank rotors mounted in said boxes and having their outer cranks connected to said connecting rods, pitman rods connected to the piston rods and connected to the inner cranks of the rotors at diametrically opposite points to the connections of the connecting rods, and inclined braces interposed between the main frame and the lower corner portions of the pendent frame.

2. In a locomotive, the combination with the main frame, drive wheels, connecting rods on said wheels, cylinders, pistons movable in said cylinders, and rods on the pistons; of hanger guides connected to the main frame and receiving said rods, a transverse pendent frame on the main frame and having journal boxes, twin-crank rotors mounted in said boxes and having their outer cranks connected to said connecting rods, pitman rods connected to the piston rods and connected to the inner cranks of the rotors at diametrically opposite points to the connections of the connecting rods, and inclined braces interposed between the main frame and the lower corner portions of the pendent frame; the said pendent transverse frame comprising opposed members of general U-shape connected together and having matched journal box sections.

3. In a locomotive, the combination with the main frame, drive wheels, connecting rods on said wheels, cylinders, pistons movable in said cylinders, and rods on the pistons, of twin-crank rotors supported below the main frame and connected to said connecting rods, and pitman rods interposed between and connected to the piston rods and the rotors.

4. In a locomotive, the combination with the main frame, drive wheels, connecting rods on said wheels, cylinders, pistons movable in said cylinders, and rods on the pistons; of twin-crank rotors supported below the main frame and connected to said connecting rods, and pitman rods interposed between and connected to the piston rods and the rotors, the connection of the pitman rods to the piston rods being effected through the medium of sleeves adjustably fixed on the piston rods and having pins disposed in said pitman rods.

In testimony whereof we affix our signatures.

LOZELLA A. WILLIAMSON.
GEORGE PINTO.